US011872709B2

(12) United States Patent
Mengerink et al.

(10) Patent No.: US 11,872,709 B2
(45) Date of Patent: Jan. 16, 2024

(54) SHAVING DEVICE, SHAVING SYSTEM WITH THE SHAVING DEVICE AND A CLEANING DEVICE, AND A CLEANING METHOD

(71) Applicant: KONINKLIJKE PHILIPS N.V., Eindhoven (NL)

(72) Inventors: Tim Mengerink, Leek (NL); Johannes Antonius Jansen, Utrecht (NL); Oedilius Johannes Bisschop, Drachten (NL); Jeroen Christian Nijdam, Eelderwolde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 56 days.

(21) Appl. No.: 17/283,029

(22) PCT Filed: Jul. 10, 2020

(86) PCT No.: PCT/EP2020/069541
§ 371 (c)(1),
(2) Date: Apr. 6, 2021

(87) PCT Pub. No.: WO2021/018549
PCT Pub. Date: Feb. 4, 2021

(65) Prior Publication Data
US 2022/0143852 A1 May 12, 2022

(30) Foreign Application Priority Data
Jul. 30, 2019 (EP) .................................... 19189221

(51) Int. Cl.
*B26B 19/38* (2006.01)

(52) U.S. Cl.
CPC ........ *B26B 19/388* (2013.01); *B26B 19/3833* (2013.01); *B26B 19/3853* (2013.01)

(58) Field of Classification Search
None
See application file for complete search history.

(56) References Cited

U.S. PATENT DOCUMENTS 5,711,328 A 1/1998 Braun
6,371,136 B1 * 4/2002 Hoser .................... A45D 27/46
134/201

(Continued)

FOREIGN PATENT DOCUMENTS

| | | | |
|---|---|---|---|
| EP | 3 815 569 | A1 * | 5/2021 |
| JP | 2001198367 | | 7/2001 |
| WO | 2004/086901 | | 10/2004 |

OTHER PUBLICATIONS

International Search Report and Written Opinion dated Dec. 2, 2020 for International Application No. PCT/EP2020/069541 Filed Jul. 10, 2020.

*Primary Examiner* — Hwei-Siu C Payer

(57) ABSTRACT

A shaving system comprises a shaving device and a cleaning device. The shaving device has an orientation sensor for generating an output signal representing the orientation of the shaving device. The cleaning device supports the shaving device in a cleaning position with a predefined cleaning orientation. The cleaning device is controlled to operate according to a predefined cleaning program for cleaning the shaving unit when the orientation sensed by the orientation sensor corresponds to said predefined cleaning orientation. This shaving device thus makes use of an orientation sensor to identify when the shaving device is in a cleaning orientation. This gives a low cost sensing solution and enables a single user input button to be used for operating the shaving device and for starting a cleaning program.

20 Claims, 11 Drawing Sheets

(56) References Cited

U.S. PATENT DOCUMENTS

| | | | | |
|---|---|---|---|---|
| 7,143,517 | B2 | 12/2006 | Kappes | |
| 7,451,770 | B2 * | 11/2008 | Saito | A45D 27/46<br>134/135 |
| 8,177,918 | B2 * | 5/2012 | Schmitt | A45D 27/46<br>134/169 R |
| 8,505,205 | B2 * | 8/2013 | Wevers | B26B 19/3833<br>30/41.5 |
| 11,389,977 | B2 * | 7/2022 | Lap | A45D 27/46 |
| 2006/0042103 | A1 * | 3/2006 | Chasen | A45D 27/46<br>30/537 |
| 2006/0048802 | A1 | 3/2006 | Kappes | |
| 2009/0019702 | A1 * | 1/2009 | Wevers | A45D 27/46<br>30/41.5 |
| 2017/0043490 | A1 | 2/2017 | Uit De Bulten | |
| 2019/0061183 | A1 | 2/2019 | Neyer | |
| 2022/0143852 | A1 * | 5/2022 | Mengerink | B26B 19/3833 |

* cited by examiner

SHAVING DEVICE, SHAVING SYSTEM WITH THE SHAVING DEVICE AND A CLEANING DEVICE, AND A CLEANING METHOD

CROSS REFERENCE TO RELATED APPLICATIONS

This application is the U.S. National Phase application under 35 U.S.C. § 371 of International Application No. PCT/EP2020/069541 filed Jul. 10, 2020, which claims the benefit of European Patent Application Number 19189221.5 filed Jul. 30, 2019. These applications are hereby incorporated by reference herein.

FIELD OF THE INVENTION

The present invention relates to a shaving system comprising a shaving device and a cleaning device for the shaving device. The invention further relates to a shaving device for use in such a shaving system and a cleaning method.

BACKGROUND OF THE INVENTION

WO 2004/086901 discloses a shaving system comprising a shaving device and a cleaning device. The shaving device comprises a main housing and a shaving unit coupled to the main housing, wherein the main housing accommodates an electric motor for driving the shaving unit. The cleaning device comprises a supporting structure for supporting the shaving device, and a receiving space for receiving the shaving unit when the shaving device is arranged in a cleaning position supported by the supporting structure.

The cleaning device comprises a reservoir for containing a cleaning fluid and a pump for transporting the cleaning liquid from the reservoir to the receiving space.

In the known shaving system, the shaving device can be supported upside down within a support of the cleaning device that can be manually moved downwardly so that the shaving unit enters into a reservoir into which the cleaning fluid from the reservoir can be pumped using an external manually operated pumping system.

Such a shaving system is advantageous for keeping a hygienic shaving device so that a clean shaving unit can be used for the next shave. The cleaning of the shaving unit is also beneficial for maintenance of the system.

The utilization of a dedicated cleaning device according to WO 2004/086901 is not convenient for the user, because the pumping unit of the cleaning device must be driven manually.

WO 2004/080235 discloses a shaving system comprising a shaving device and a cleaning device, wherein the cleaning device comprises an electric pump for transporting the cleaning liquid from the reservoir to the receiving space. The presence of the electric pump in the cleaning device and the electric components required for the control of the pump and for the supply of electric power to the pump increase the complexity and costs of the shaving system.

The applicant has proposed (but not yet published) an approach by which the motor of the shaver device is used to drive a pump of the cleaning unit, when the shaving device is docked to the cleaning unit. This may for example allow the cleaning unit to be entirely mechanical, thereby reducing the overall cost of the system, while maintaining ease of use for the user.

The cleaning function for example involves a particular sequence of pump operations, to implement a cleaning cycle. Thus, there is a different operation of the shaving device motor for normal shaving and for the cleaning cycle.

It would be desirable to automate the different modes as much as possible, for example so that the user may control the device with a single on-off switch. Thus, it would be desirable for the system itself to detect when a shaving mode is required and when a cleaning mode is required, and to control the shaving device motor accordingly. Ideally, this should be achieved by the shaving device, particularly if it is desired to avoid sensors and electronics in the cleaning device.

SUMMARY OF THE INVENTION

The invention is defined by the claims.

According to the invention, there is provided a shaving system comprising a shaving device, a cleaning device and a processing unit, wherein:

- the shaving device comprises a main body accommodating a motor, a shaving unit coupled to the main body and an orientation sensor for generating an output signal representing the orientation of the shaving device;
- the cleaning device comprises a supporting structure for supporting the shaving device in a cleaning position for cleaning the shaving unit, the shaving device having a predefined cleaning orientation in said cleaning position; and
- the processing unit is adapted to control the cleaning device to operate according to a predefined cleaning program for cleaning the shaving unit,
- characterized in that the processing unit is adapted to:
  - receive the output signal generated by the orientation sensor; and
  - control the cleaning device to operate according to the predefined cleaning program when the orientation sensed by the orientation sensor corresponds to said predefined cleaning orientation.

This shaving device makes use of an orientation sensor to identify when the shaving device is in a cleaning orientation. This is possible because the cleaning orientation, with the shaving device supported by the cleaning device (i.e. docked), is deliberately different to a normal orientation in use. For example, the cleaning orientation may be with the shaving unit facing vertically downwards, which is different to a typical orientation in use of the shaving device.

By using an orientation sensor, such as an accelerometer, a low cost sensing solution is provided. It means that no docking sensor is needed in the cleaning unit, thereby reducing the cost and complexity of the system. The cleaning device may for example be fully mechanical and hence not need any electrical power supply.

The shaving unit for example comprises at least two hair-cutting units (and preferably three) each having an external cutting member and an internal cutting member which is rotatable relative to the external cutting member.

The processing unit is for example adapted to control the cleaning device to operate according to the predefined cleaning program when the orientation sensed by the orientation sensor is any orientation within a predefined range of angular orientations relative to the cleaning orientation.

The cleaning orientation may be vertical, so that the range of angles lies at each side of (or all around, in 3D) the vertical. However, the cleaning orientation may be offset from the vertical, or the orientation sensor may be mounted on a substrate that is not parallel with the general orientation of the shaving device. Thus, there are many possibilities. Basically, there is an angle of the shaving device when in the cleaning position, and the orientation sensor detects this angle with some tolerance, hence the detection of a range of angles.

The shaving device may further comprise a motion sensor for generating an output signal representing motion of the shaving device, and the processing unit is adapted to receive the output signal generated by the motion sensor and to control the cleaning device to operate according to the predefined cleaning program when the orientation sensed by the orientation sensor is any orientation within said predefined range of angular orientations and the motion sensor senses no movement for a first predefined time period.

The motion sensor may be a separate device to the orientation sensor, or it may be implemented by the orientation sensor. Thus, the determination that the cleaning program may be implemented may be based both on a particular cleaning orientation and by a lack of movement of the shaving device (either away from that cleaning orientation or movement with that cleaning orientation retained) for a predefined time period. Normal operation of a shaver involves movement of the shaver, even if the shaving device is in the cleaning orientation (for example shaving the top of the head). This use mode will therefore not trigger the cleaning program by additionally taking movement into account.

The processing unit may be adapted:

- to pause the predefined cleaning program, after being started, when the orientation sensed by the orientation sensor is outside the predefined range of angular orientations;
- to cancel the predefined cleaning program, after being paused, when the orientation sensed by the orientation sensor is outside the predefined range of angular orientations for more than a second predefined time period, and then implement a power-off function of the shaving system; and
- to resume the predefined cleaning program, after being paused, when the orientation sensed by the orientation sensor is again within the predefined range of angular orientations before expiry of said second predefined time period.

A brief interrupt to the cleaning program is thus permitted e.g. if the shaving device is undocked (for example if the user needs to look more closely at the display) and then re-docked, but a prolonged interruption results in a cancelled cleaning program, and the shaving device is then turned off.

The system for example also implements a power off function after the cleaning program has been completed. An output may be provided to a display to indicate if a cleaning program is needed, when the display device is turned on, for example when shaving device is powered on. The need for a cleaning program may be based on the time of use since the last cleaning program. It reminds the user to perform cleaning as soon as the shaving device is activated.

When turned off, the motion sensing may still be active but not the orientation sensing, whereas when turned on, the orientation sensing and motion sensing is active. The shaving device is thus able to detect movement even in the off state. This may for example be useful to trigger the shaving device to turn on a display in response to movement, before the shaving device is powered on by the user. Thus, status information may be given as soon as the user picks up the shaving device, such as the battery state of charge or an indication of whether or not the cleaning program is required. Thus, the display may indicate if a cleaning program is needed, even before the shaving device is powered on.

The cleaning device may comprise a reservoir for holding a cleaning fluid and a pump for circulating the cleaning fluid. This is one possible design of the cleaning device. The pump for example transports the cleaning liquid from the reservoir to a receiving space in which the shaving unit is positioned when the shaving device is in the cleaning position.

In a first set of examples, the processing unit is accommodated in the main body of the shaving device.

The shaving unit will already include a processing unit, and by incorporating the control of the cleaning device into the shaving device, the number of components of the overall system can be kept to a minimum.

The shaving device may then further comprise a drive coupling which is accessible from an outside of the shaving device and drivable by the motor. The cleaning device then comprises a driven coupling for mechanical connection to the drive coupling of the shaving device when the shaving device is in the cleaning position, such that the motor of the shaving device provides mechanical driving of the pump of the cleaning device.

The processing unit is then adapted to control the motor of the shaving device according to the predetermined cleaning program when the orientation sensed by the orientation sensor corresponds to said predefined cleaning orientation, such that the cleaning device is driven by the motor to operate according to the predetermined cleaning program when the shaving device is in the cleaning position.

This version provides a mechanical coupling between the shaving device and the cleaning device. It means the cleaning device can be passive, i.e. driven by the shaving device rather than needing a local power supply, motor or controller. The cleaning device thus does not need any electronics for implementing the cleaning program. All electrical parts are within the shaving device, reducing the complexity of the overall system. The necessary drive for the pumping unit is derived from the drive system of the shaving device.

The drive coupling can be arranged in any suitable position on the shaving device, e.g. on the shaving unit or on a main housing of the shaving device, such that the drive coupling engages a driven coupling of the cleaning device when the shaving device is docked in the cleaning position, supported by the cleaning device. The drive coupling is for example arranged centrally between hair-cutting units of the shaving device.

The drive coupling may for example only be drivable when the shaving device is in the cleaning orientation. In this way, movement of the drive coupling, which is accessible from the outside of the shaving device, is avoided when the shaving device is used in a regular shaving operation. In alternative embodiments, the drive coupling may be driven during a regular shaving operation, in particular continuously driven. The drive coupling can then be prevented from interfering with the normal shaving operation, in particular from touching the skin during the normal shaving operation, by arranging the drive coupling member in a recessed position, e.g. between the hair-cutting units.

The shaving device may then comprise a user input device for receiving a power-on input from a user, the processing unit is adapted to receive the power-on input from the user input device and the processing unit is adapted to start the motor of the shaving device to operate according to a shaving program unless or until the processing unit starts the motor to operate according to the predefined cleaning program.

A same user input, namely a power-on command using a single input button, may be used to commence a cleaning program or to commence a shaving operation. The shaving operation may be the default, and this is changed to a cleaning program if and when the cleaning orientation is detected, i.e. after the predefined time period. Thus, a user can provide a power-on command and then dock the shaver in the cleaning device, or the user can dock the shaver in the cleaning device then provide the power-on command. In both cases, there is an initial period of operation in the shaving mode after which the cleaning orientation is detected for the first threshold time period, and the cleaning program then begins.

In another set of examples, the processing unit is part of the cleaning device.

In this case, the shaving device only needs to provide the orientation sensor output signal to the cleaning device, and the cleaning device performs the interpretation and control functions. The cleaning device is then an electrical system. It may for example have an electric pump for recirculating cleaning fluid, but it may instead operate according to other principles, such as using ultrasound or UV light as part of the cleaning program.

The shaving device in this case relays electrical commands or information to the cleaning device, which then has a local controller and power supply.

The invention also provides a shaving device for use in a shaving system as defined above, comprising the shaving device and a cleaning device. The shaving device comprises:

- a main body accommodating a motor;
- a shaving unit coupled to the main body;
- an orientation sensor for generating an output signal representing the orientation of the shaving device;
- a drive coupling which is accessible from an outside of the shaving device and drivable by the motor; and
- a processing unit adapted to:
  - receive the output signal generated by the orientation sensor; and
  - control the motor to operate according to a predefined cleaning program for the cleaning device when the orientation sensed by the orientation sensor corresponds to a predefined cleaning orientation of the shaving device such that, when the shaving device has said predefined cleaning orientation when being supported in a cleaning position by the cleaning device with the drive coupling coupled to a driven coupling of the cleaning device, the cleaning device is driven by the motor to clean the shaving unit according to the cleaning program.

This defines the shaving device which includes the processing of the output signal of the orientation sensor and then controls the cleaning device by a mechanical drive coupling to the cleaning device.

The processing unit is for example adapted to:

- control the motor to operate according to the predefined cleaning program when the orientation sensed by the orientation sensor is within a predefined range of angular orientations relative to the vertical direction.

The shaving device may further comprise a motion sensor for generating an output signal representing motion of the shaving device and the processing unit is adapted to receive the output signal generated by the motion sensor and to control the motor to operate according to the predefined cleaning program when the orientation sensed by the orientation sensor is within said predefined range of angular orientations and the motion sensor senses no movement for a predefined time period.

The invention also provides a cleaning method for cleaning a shaving unit of a shaving device, using a cleaning device which comprises a supporting structure for supporting the shaving device in a cleaning position for cleaning the shaving unit, the shaving device having a predefined cleaning orientation in said cleaning position, wherein the shaving device comprises a main body accommodating a motor, said shaving unit being coupled to the main body, and an orientation sensor for generating an output signal representing the orientation of the shaving device, the method comprising:

- controlling the cleaning device to operate according to a predefined cleaning program for cleaning the shaving unit;
- receiving the output signal generated by the orientation sensor of the shaving device;
- detecting whether the shaving device is in the cleaning orientation based on the output signal of the orientation sensor; and
- controlling the cleaning device to operate according to a predefined cleaning program when the orientation sensed by the orientation sensor corresponds to said predefined cleaning orientation.

Controlling the cleaning device for example comprises:

- mechanically connecting a drive coupling of the shaving device to a driven coupling of the cleaning device;
- driving the drive coupling by means of the motor of the shaving device; and
- controlling the motor such that the motor drives the cleaning device to operate according to the predefined cleaning program.

The method may be implemented at least in part in software.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE EMBODIMENTS

The invention provides a shaving system comprising a shaving device and a cleaning device. The shaving device has an orientation sensor for generating an output signal representing the orientation of the shaving device. The cleaning device supports the shaving device in a cleaning position with a predefined cleaning orientation. The cleaning device is controlled to operate according to a predefined cleaning program for cleaning the shaving unit when the orientation sensed by the orientation sensor corresponds to said predefined cleaning orientation. This shaving device thus makes use of an orientation sensor to identify when the shaving device is in a cleaning orientation. This gives a low cost sensing solution and enables a single user input button to be used for operating the shaving device and for starting a cleaning program.

Figure 1:
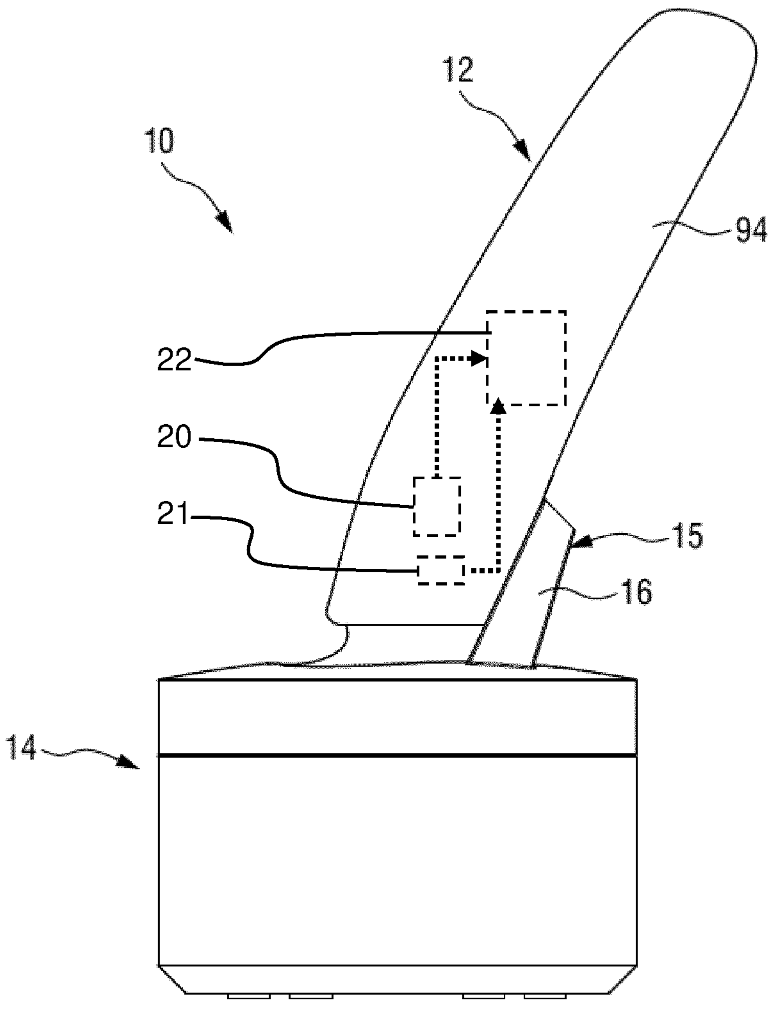
FIG. 1 shows a perspective view of a shaving system according to the invention, wherein a shaving device with an orientation sensor is placed on a support structure of a respective cleaning device.

FIG. 1 shows a shaving system 10 according to one example of the invention. The shaving system 10 comprises a shaving device 12 having a main housing 94 and a cleaning device 14 including a support structure 15. The shaving device 12 can be placed on the cleaning device in a cleaning position. In the cleaning position, the shaving device 12 has a predefined cleaning orientation. As shown, the cleaning orientation is essentially vertical with the shaving unit facing downwardly. The cleaning device 14 comprises a pot-shaped housing and a rest 16 protrudes from the top of the housing. The rest 16 serves to support a main housing of the shaving device 12 when the shaving device 12 is placed on the support structure 15 as shown in FIG. 1.

FIG. 1 further schematically shows an orientation sensor 20 provided in the main housing of the shaving device 12. The orientation sensor 20 provides an output signal representing the orientation of the shaving device, and this output is provided to processing unit 22. The processing unit uses the orientation sensor information to control the cleaning device. In particular, the processing unit controls the cleaning device to operate according to a predefined cleaning program when the orientation sensed by the orientation sensor corresponds to the predefined cleaning orientation. Note that the orientation sensed is not the only control condition, so that the cleaning program cannot operate when the correct orientation is not sensed, but other conditions may need to be met even when the correct orientation is sensed.

The orientation sensed by the orientation sensor may be considered to correspond to the cleaning orientation when it is within a predefined range of angular orientations relative to the cleaning orientation, and hence within a predefined range relative to the vertical direction. The cleaning orientation may indeed be vertical (if a PCB which carries the orientation sensor is vertical when the shaving device is supported by the cleaning device), so that the range of angles lies at each side of the vertical. However, the cleaning orientation may be offset from the vertical, or more generally the sensed orientation corresponding to the cleaning orientation may be offset from the vertical.

The predefined range of angular orientations may for example be 11 degrees each side of the cleaning orientation. More generally, the predefined range of angular orientations may extend to a value between 5 and 15 degrees to each side of the cleaning orientation. In three dimensions, the predefined range of angular orientations defines a cone of possible orientations which are considered to correspond to the cleaning orientation.

The shaving device thus makes use of an orientation sensor to identify when the shaving device is in a cleaning orientation. This is possible because the cleaning orientation, with the shaving device supported by the cleaning device (i.e. docked), is deliberately different to a normal orientation in use. For example, the shaving unit facing vertically downwards is different to a typical orientation in use of the shaving device. However, to ensure the cleaning position is correctly identified, movement of the shaving device is preferably also be taken into account.

For this purpose, the shaving device may further comprise a motion sensor 21 for generating an output signal representing motion of the shaving device. The processing unit 22 then controls the cleaning device to operate according to the predefined cleaning program when the orientation sensed by the orientation sensor is within said predefined range of angular orientations and the motion sensor senses no movement (either away from that cleaning orientation or movement with that cleaning orientation retained) for a first predefined time period. Normal operation of a shaver involves movement of the shaver, even if the shaving device is in the cleaning orientation (for example shaving the top of the head). This will therefore not trigger the cleaning program.

The motion sensor may be a separate device to the orientation sensor (as schematically shown in FIG. 1), or it may be implemented by the orientation sensor.

In one example, the orientation and movement sensing provides two levels of motion detection. When the shaving device is on or during charging, the orientation sensor (accelerometer) is active and enables data to be generated relating to motion patterns and orientation. The accelerometer is de-activated when the shaving device is turned off, but there is still motion detection by the motion sensor 21 but with no orientation or motion details.

Figure 2:
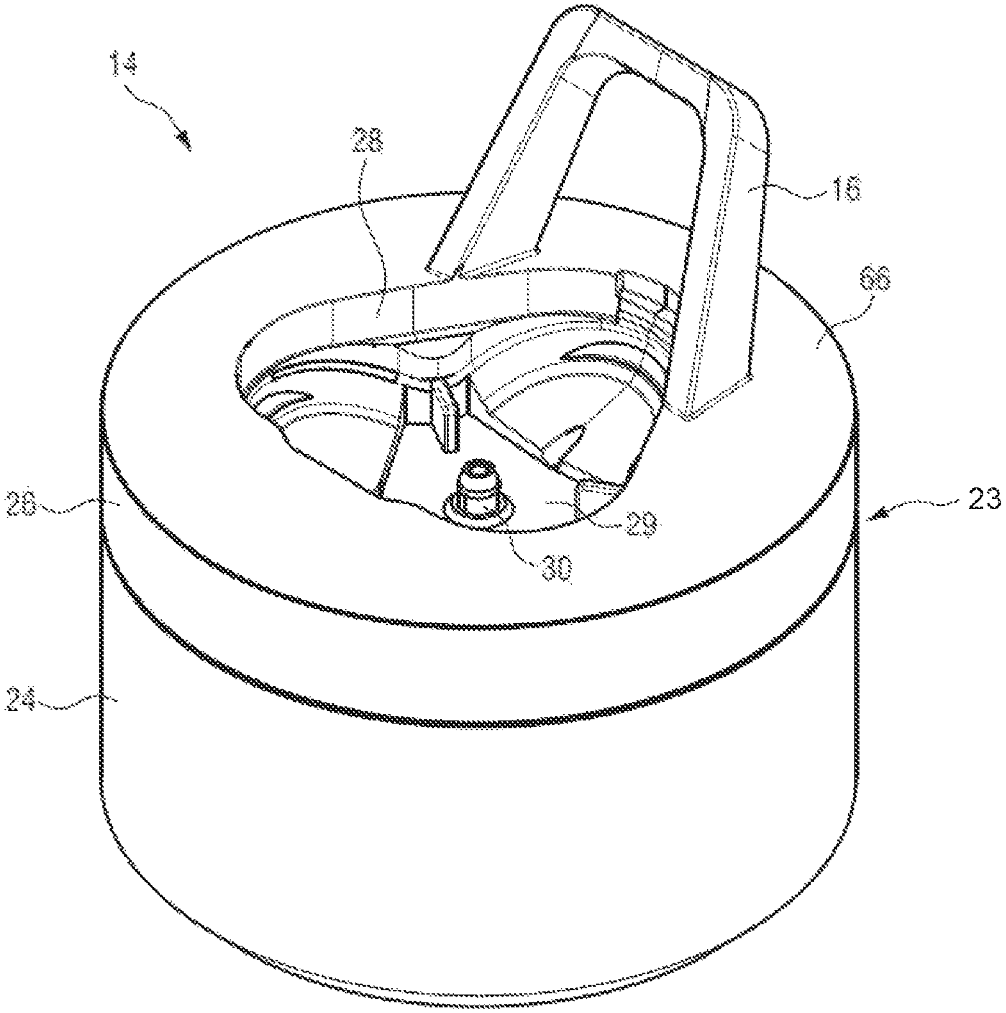
FIG. 2 shows an enlarged perspective view of the cleaning device of the shaving system of FIG. 1 without the shaving device.

FIG. 2 is an enlarged perspective representation of the cleaning device 14. It comprises the pot-shaped housing 23 with a lower housing portion 24 onto which an upper housing portion 26 is placed. The upper housing portion 26 has a top wall 66, wherein a substantially triangular opening is formed that provides access to a receiving space 28 extending into the interior of the housing 23. The shape of the receiving space 28 corresponds to the shape of a respective shaving unit (e.g. a three headed shaving unit in this example) provided on the shaving device 12. When the shaving device 12 is placed with its shaving unit within the receiving space 28 as shown in FIG. 1, the main housing of the shaving device 12, which is in the shape of a handle, is supported by the rest 16.

FIG. 2 also shows a driven coupling 30 provided in a central position of the receiving space 28 on the bottom wall 29 thereof. When the shaving device 12 is placed with its shaving unit within the receiving space 28 of the cleaning device 14, as shown in FIG. 1, the driven coupling 30 is coupled with a respective drive coupling of the shaving unit of the shaving device 12, as will be explained below. Thus, the shaving device is used to drive the cleaning device, for example to drive a pump of the cleaning device which circulates cleaning fluid within the cleaning device.

Figure 3:
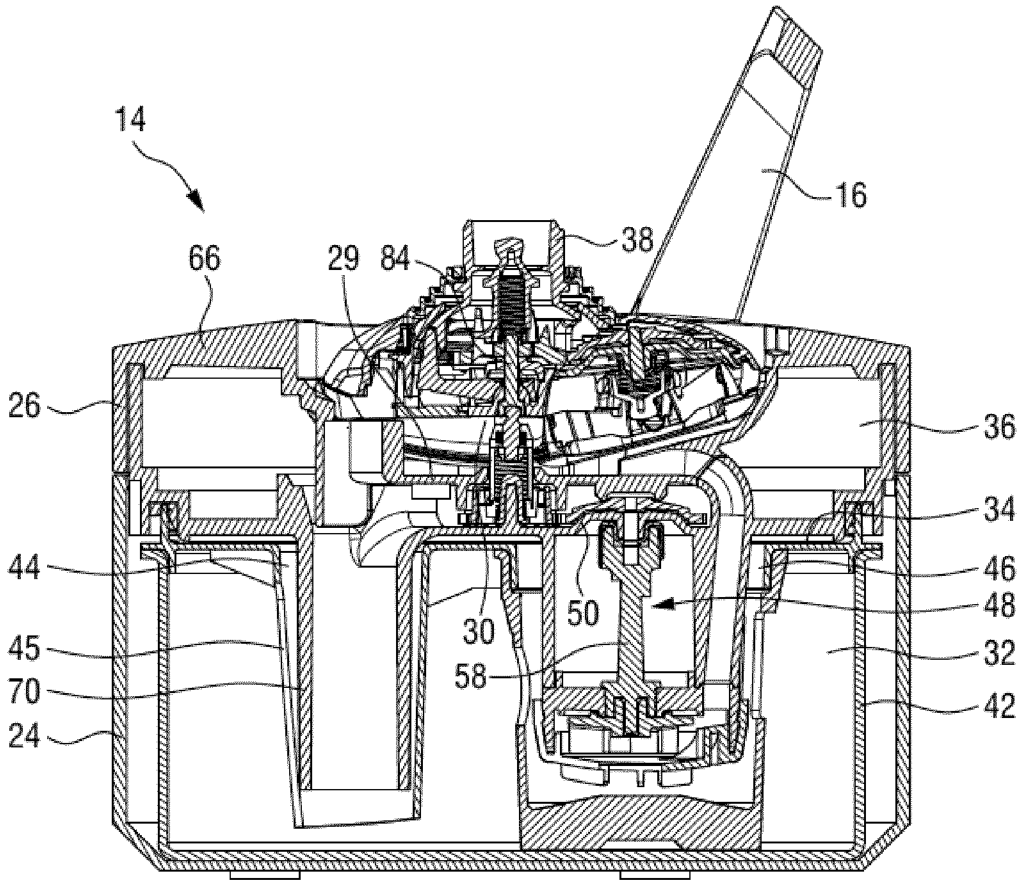
FIG. 3 shows a cross-section of the cleaning device of FIG. 2, wherein in addition the shaving unit of the shaving device is shown in a docked cleaning position within the cleaning device.
Figure 4:
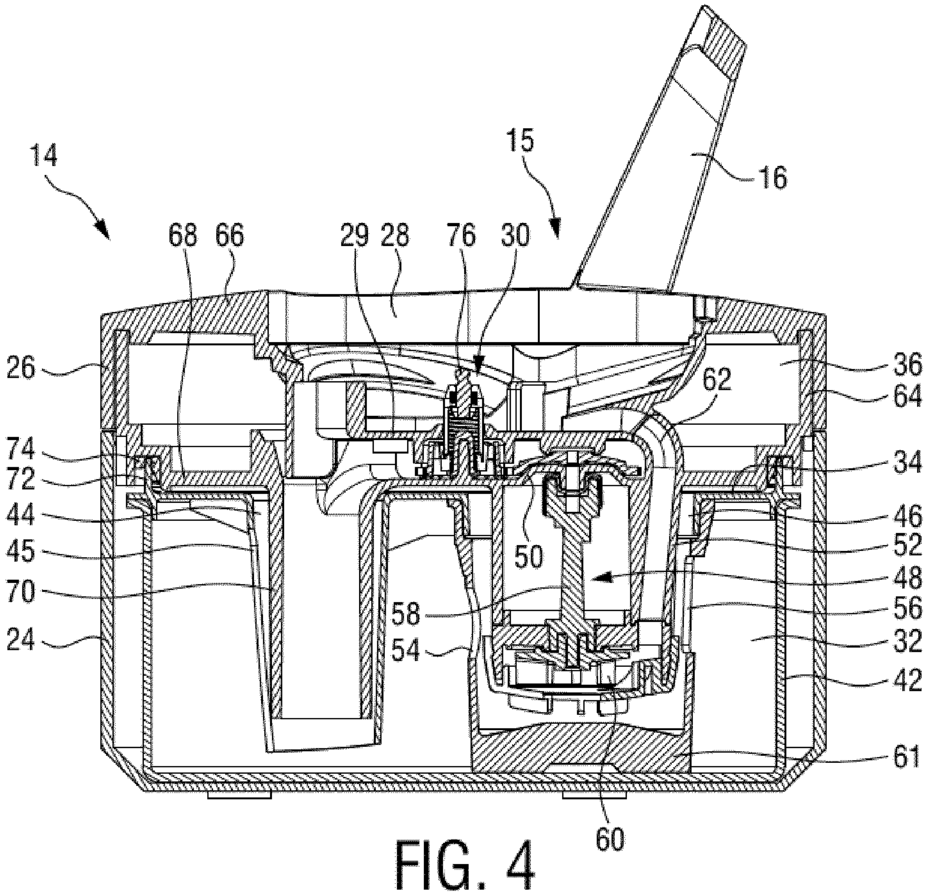
FIG. 4 shows the cross-sectional view according to FIG. 3, but without the shaving unit of the shaving device.

FIG. 3 is a cross-sectional representation of the cleaning device 14, wherein in addition the shaving unit 38 of the shaving device 12 is shown in a cleaning position within the respective receiving space. FIG. 4 shows the same cleaning device with the shaving device removed, leaving the receiving space 28 empty.

Within the lower housing portion 24 of the cleaning device is a cartridge 32 that is placed within the lower housing portion 24 when the upper housing portion 26 is removed. The cartridge 32 defines a reservoir for containing a cleaning liquid and can be provided as a separate consumer replaceable part, which the user can insert into the cleaning device 14 and which needs to be replaced usually after a certain number of cleaning operations.

As shown in FIGS. 3 and 4, in the upper housing portion 26, below the top wall 66 thereof and enclosed by an annular side wall 64 and a bottom wall 68, there is formed a basin 36 into which cleaning fluid can be pumped from the cartridge 32. Within the top wall 34 of the cartridge 32 there is one smaller cavity 44 and one larger cavity 46 that both extend downwardly from the top wall 34 of the cartridge 32 towards the bottom of the cartridge 32. They are within an outer housing 42. The first smaller cavity 44 is surrounded by a cone-shaped wall 45. The second larger cavity 46 within the cartridge 32 is surrounded by a substantially cylindrical pump receptacle 61 that extends from the top wall 34 of the cartridge 32 towards the bottom thereof and that includes lateral suction openings 54, 56.

From the bottom wall 68 of the upper housing portion 26 there protrudes a pipe stud 70 into the cone-shaped first cavity 44 of the cartridge 32.

From the bottom wall 68 of the upper housing portion 26 there further protrudes a pump 48 downwardly into the pump receptacle 61 of the cartridge. The pump 48 is surrounded by a pump housing 52 and includes a pinion 58 that reaches downwardly and that drives a pump impeller 60 attached at the lower end thereof.

The driven coupling 30 is coupled to the pump 48 by means of a drive unit 50 transferring a rotating motion of the driven coupling 30 onto the pinion 58 of the pump 48.

Thus, when the driven coupling 30 is driven by the shaving device 12, the pinion 58 of the pump 48 is driven via the drive unit 50. Thus, the pump impeller 60 is rotated so as to draw cleaning fluid through the suction openings 54, 56 and to pass it through a feed channel 62 upwardly into the receiving space 28 for cleaning the shaving unit of the shaving device 12.

FIG. 4 shows suitable seals 74 between an annular rim 72 of the cartridge 32 and the upper housing portion 26 to effect a sealing between the cartridge 32 and the upper housing portion 26.

At the center of the receiving space 28 there is the driven coupling 30 that includes a protrusion 76 (FIG. 4) protruding upwardly that is mated to a respective drive coupling 82 provided on the shaving unit 38 (FIG. 3).

When the shaving device 12 is placed correctly on the cleaning device 14 in the cleaning position (i.e. with the cleaning orientation), the drive coupling 82 will be coupled by a rotational connection with the driven coupling 30 arranged at the center of the receiving space 28.

If the coupling is effected between the shaving device 12 and the cleaning device 14 in the cleaning position, then the driven coupling 30 drives the pump 48 via the drive unit 50. In this case cleaning fluid is sucked through the suction openings 54, 56 by the pump impeller 60 and is fed through the feed channel 62 into the receiving space 28 to clean the shaving unit 38. During the pumping operation, the cleaning fluid, that is circulated around the shaving unit 38 for cleaning it, is contained within the basin 36 and flows back into the interior of the cartridge 32 through the pipe stud 70 and through another, smaller cavity (92 shown in FIG. 9) extending from the top wall 34 of the cartridge 32 down towards the bottom thereof.

Figure 5:
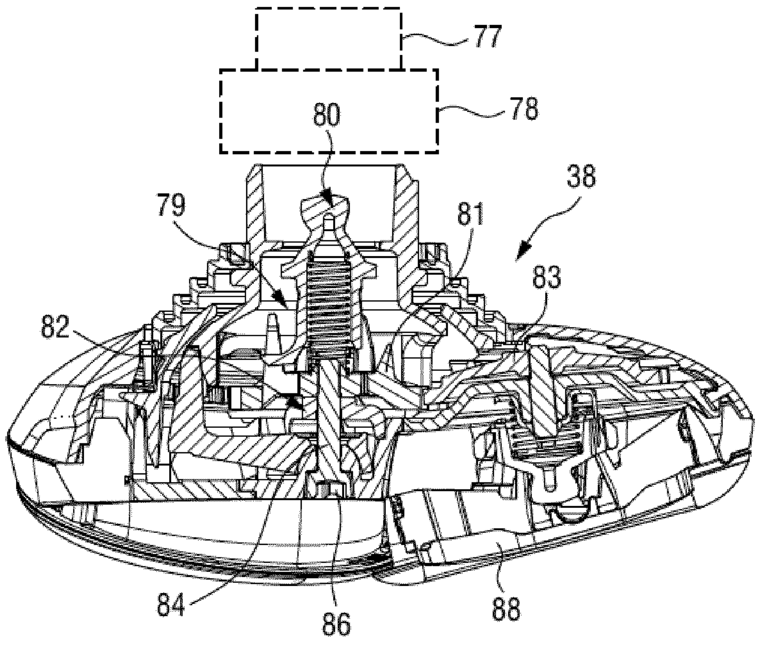
FIG. 5 shows an enlarged cross-section of the shaving unit together with an associated electric actuator (motor) and a first drive unit of the shaving device of FIG. 1.

FIG. 5 shows the shaving unit 38 in more detail.

The shaving unit 38 is driven by motor only indicated in dashed lines by reference numeral 77. The motor 77 drives a first drive unit 78 also indicated in FIG. 5 only by dashed lines. The motor 77 and the first drive unit 78 are accommodated in the handle-shaped main housing of the shaving device 12. The first drive unit 78 is coupled to a coupling structure 80 of the shaving unit 38 via a suitable coupling member by a rotational fit. The shaving unit 38 comprises a second drive unit 79 that is coupled by the coupling structure 80 to the first drive unit 78 contained within the main housing 94 of the shaving device 12.

Figure 6:
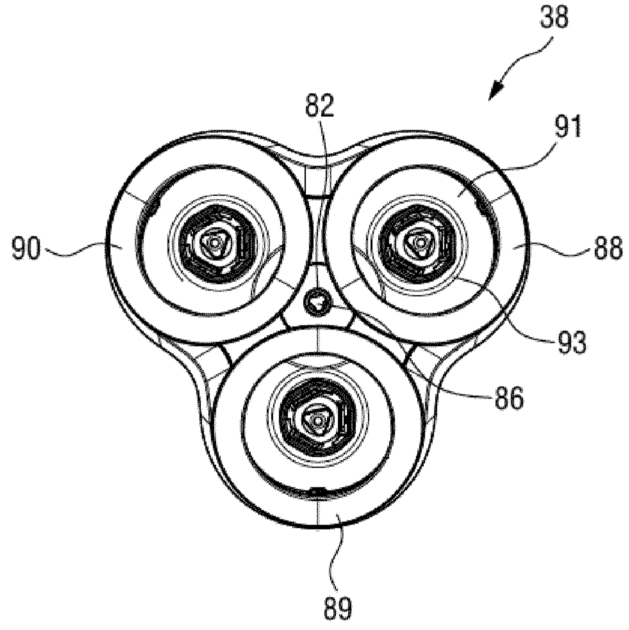
FIG. 6 shows an enlarged top view of the shaving unit of the shaving device of FIG. 1 with three hair-cutting units in a first configuration with a centrally arranged drive coupling.

FIG. 6 shows that the shaving unit 38 of the shaving device 12 comprises three hair cutting units 88, 89, 90. Each hair-cutting unit 88, 89, 90 comprises an external cutting member 91 and a respective internal cutting member (not visible and only schematically indicated in FIG. 6 with reference numeral 93). The internal cutting members 93 are rotatable relative to the external cutting members 91 to effect cutting of hairs.

Returning to FIG. 5, the second drive unit 79 comprises a driving gear wheel 81 which is centrally arranged relative to the three hair-cutting units 88, 89, 90 and engages a respective driven gear wheel 83 of each of the hair cutting units. The coupling structure 80 that drives the second drive unit 79 accommodates a central drive shaft 84 that mutually couples the driving gear wheel 81 and the first drive unit 78. The drive coupling 82 is connected to the driving gear wheel 81 such as to be rotatable together with the driving gear wheel 81 about a common axis of rotation.

The central drive shaft 84 at its outer end comprises a recess 86. The recess 86 is mated to the protrusion 76 at the top end of the driven coupling 30 of the cleaning device 14 to effect a positive rotational coupling between the protrusion 76 and the recess 86.

Figure 7:
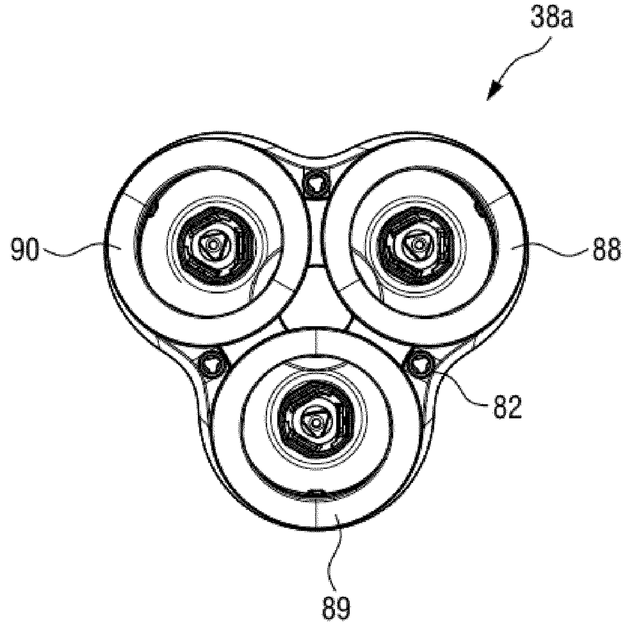
FIG. 7 shows three alternative embodiments of the shaving unit of the shaving device of FIG. 1, in particular three different alternative off-center positions for the drive coupling.

While the central arrangement of the drive coupling 82 is shown in FIGS. 5 and 6, it is also possible to arrange the drive coupling 82 off-center, as shown in FIG. 7. In the shaving unit 38*a* according to FIG. 7, three alternatively possible locations for the drive coupling 82 are shown close to the outer periphery between adjacent hair cutting units 88, 89, 90.

When the shaving device 12 is placed in the cleaning position on the support structure 15 (as shown in FIG. 1), the drive coupling 82 is coupled to the driven coupling 30 provided on the cleaning device 14. Thus the pump 48 can be driven by the drive unit 50 so that the pump impeller 60 is rotated so as to draw cleaning fluid through the suction openings 54, 56 and to pass it through the feed channel 62 into the receiving space 28 for cleaning the hair-cutting units 88, 89, 90.

Figure 8:
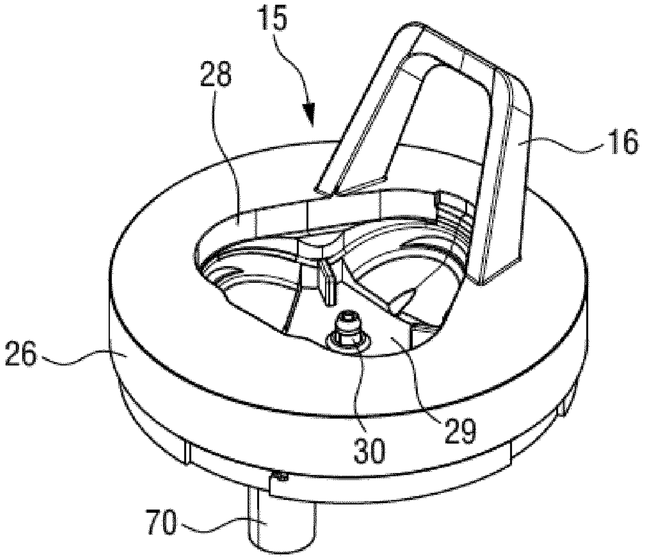
FIG. 8 shows a perspective view of an upper housing portion of the cleaning device of FIG. 1.

FIG. 8 shows the upper housing portion 26 removed from the cartridge.

Figure 9:
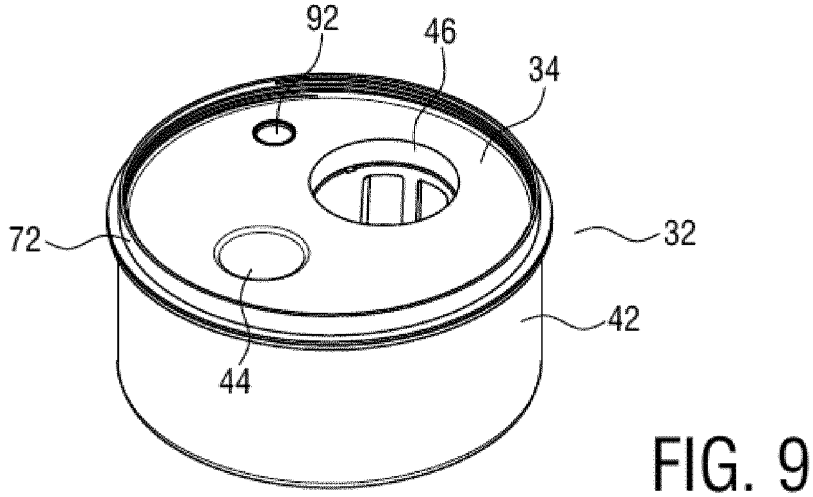
FIG. 9 shows a cartridge containing a cleaning fluid that can be introduced into a lower housing portion of the cleaning device of FIG. 1.

The cartridge 32 is shown in FIG. 9. The cartridge 32 is configured as a consumer replaceable part and will usually be replaced after a certain number of cleaning operations. To this end, the upper housing portion 26 is removed from the lower housing portion 24, then the cartridge 32 can be removed from the lower housing portion 24 and can be replaced by a new cartridge 32.

Figure 10:
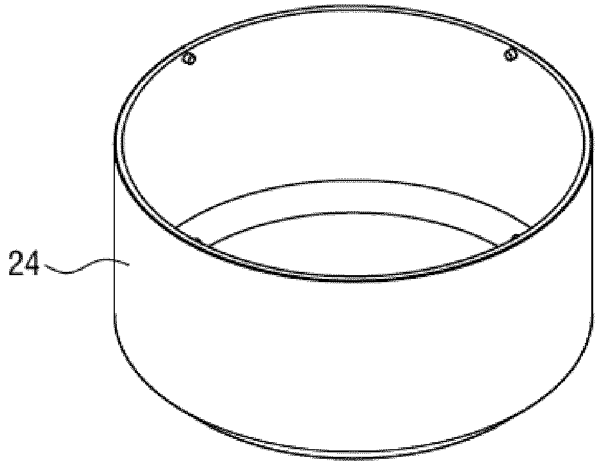
FIG. 10 shows a lower housing portion of the cleaning device of FIG. 1 with the cartridge and the upper housing portion removed.

FIG. 10 shows the lower housing portion 24 in which the cartridge of FIG. 9 can be placed.

Figure 11:
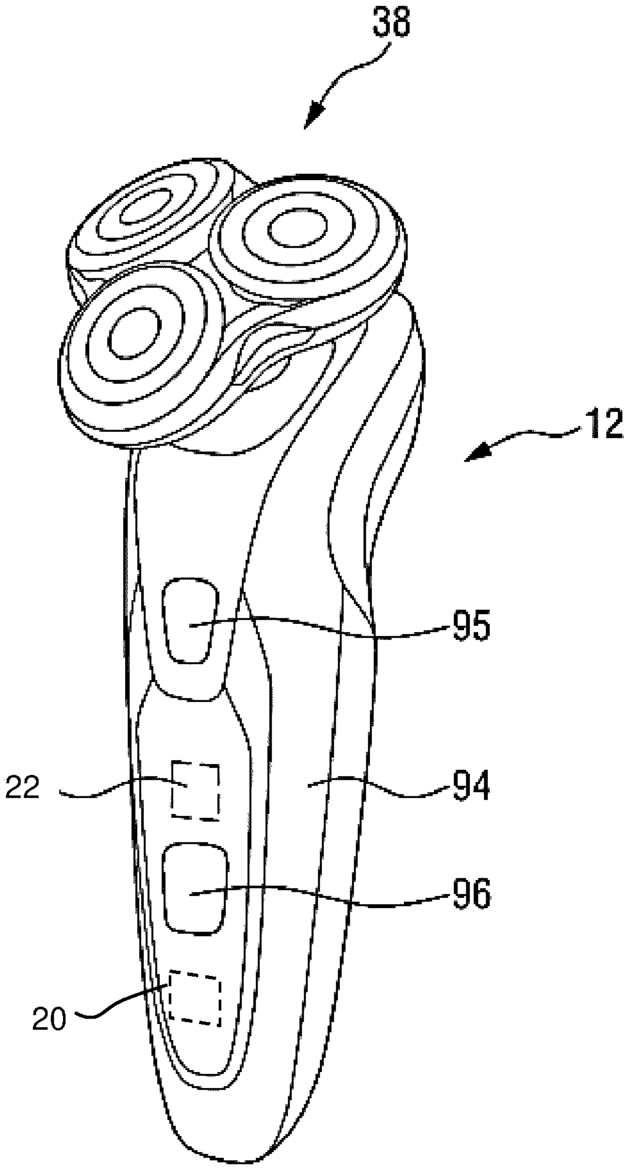
FIG. 11 shows a perspective view of the shaving device of the shaving system according to FIG. 1.

FIG. 11 shows the shaving device 12. It comprises the main body 94, the shaving unit 38, and an on-off switch 95 for receiving a power-on input. There is a display 96 for displaying status information. The orientation sensor 20 and processing unit 22, which are inside the main body 94, are also shown.

The processing unit 22 is programmed by a software program that automatically starts a cleaning procedure when the shaving device 12 is determined to be placed in the cleaning position on the support structure 15 of the cleaning device 14 in the correct position, as explained above.

Figure 12:
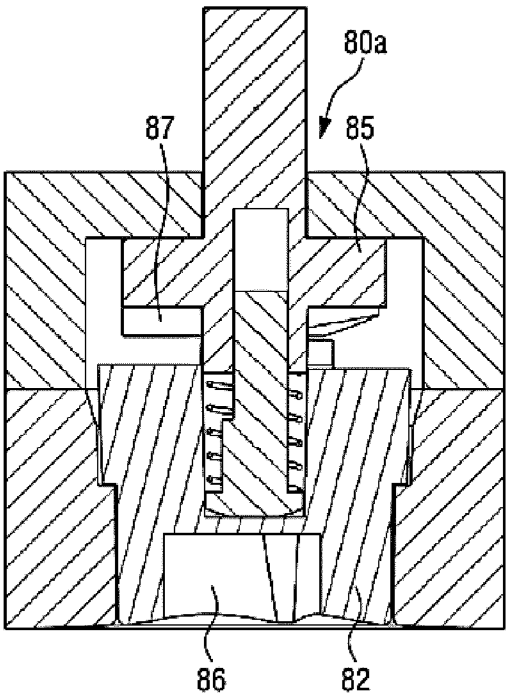
FIG. 12 shows a schematic representation of an alternative coupling structure of the shaving device of FIG. 11 that ensures that the drive coupling is driven only when the shaving device is arranged in the cleaning device in the cleaning position, shown in a non-coupled position.

FIG. 12 shows a schematic representation of an alternative coupling structure denoted in total with 80*a*, that ensures that the drive coupling 82 is driven only when the shaving device 12 is coupled to the cleaning device 14 in the cleaning position. The coupling structure 80*a* comprises an intermediate coupling member 85 that comprises a catch member 87 cooperating with the drive coupling 82 under the action of a spring member. In the non-coupled position shown in FIG. 12 the catch member 87 is not coupled with the drive coupling 82. Thus in this position the drive coupling 82 does not rotate, even when the intermediate coupling member 85 rotates.

Figure 13:
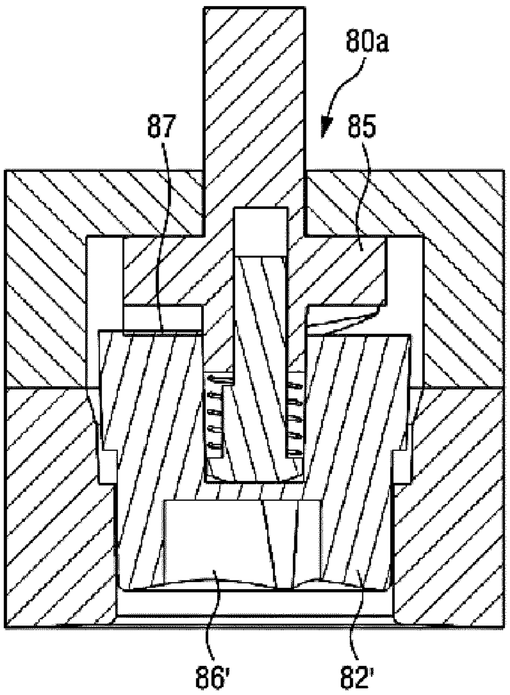
FIG. 13 shows the coupling structure according to FIG. 12 in a coupled position, when the shaving device is in the cleaning position.

FIG. 13 shows the coupling structure 80*a* in the coupled position, when the shaving device 12 is placed on the cleaning device 14 in the cleaning position. In this case the drive coupling 82 is pressed against the action of the spring member towards the intermediate coupling member 85, so that the catch member 87 engages with the drive coupling 82, so that the latter rotates when the coupling structure 80*a* rotates.

Figure 14:
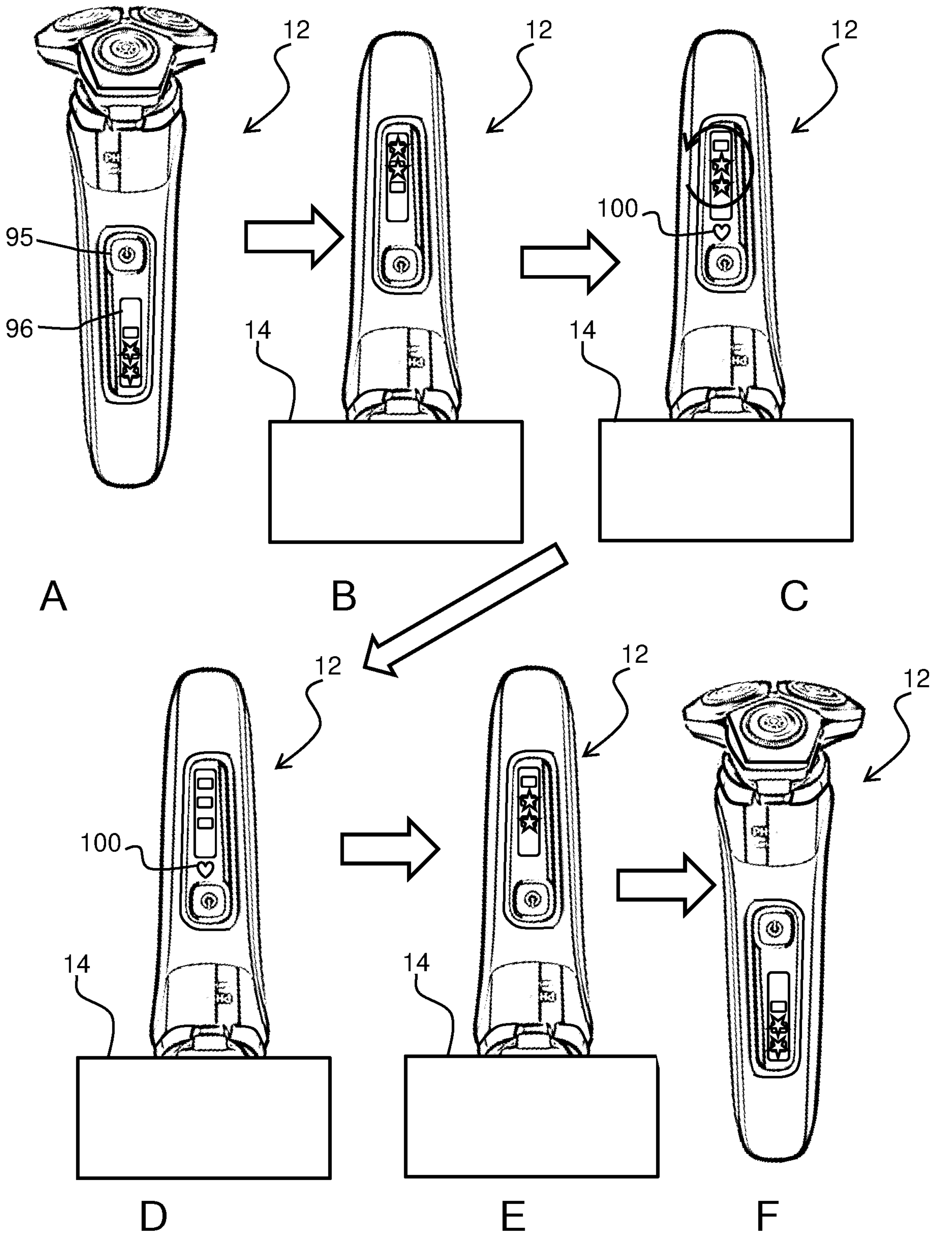
FIG. 14 shows a sequence of steps of a cleaning program.

FIG. 14 shows a typical sequence of operating states to explain the operation of the automatic cleaning program control.

In FIG. 14A, the shaving device 12 is picked up by the user. In a preferred example, the movement is detected even when the shaving device was previously turned off. This movement triggers the display 96 to display status information. For example, FIG. 14A shows a stack of two (out of three) illuminated regions to indicate a charge level of ⅔.

In addition, an icon may be shown to indicated that the cleaning program needs to be followed. Any suitable way to convey information may be used, such as illumination of the on-off switch 95. This may be determined based on a total time of use since the last cleaning program, or a combination of the time of use and other factors such as the drive speed etc.

The user then presses the on-off switch 95 to provide a power-on command. The user then docks the shaving device in the cleaning device as shown in FIG. 14B. The user may instead dock the shaving device first and then press the on-off button. As will be clear from the description below, this does not make any difference to the operation of the system.

The shaving device initially responds to the power-on command by starting a shaving mode. This for example involves driving the motor of the shaving device to a particular and constant speed.

However, if the cleaning orientation is detected, and the cleaning orientation is maintained for a first threshold period, such as 1.5 seconds, with no movement of the shaving device, then the cleaning program is started.

First, as shown in FIG. 14C, the device orientation is inverted. In particular, to show a charge level of ⅔, the top two regions (i.e. at the top of the shaving device, near the shaving unit) need to be illuminated in order to present the charge level information in the same way (i.e. with the vertically lowest two regions illuminated). This inversion is shown in FIG. 14C.

During the cleaning program, an icon 100 is displayed, for example flashing, to indicate that the cleaning program is progressing. This is shown in FIG. 14D, which represents the cleaning program time period. The charging status information may be withheld during this time. The flashing may change in character to indicate the progress through the cleaning program. The cleaning program of FIG. 14D flushes hair and debris out of the shaving unit.

FIG. 14E shows the end of the cleaning program. The cleaning icon 100 is removed, and the state of charge information is displayed again. However, the display is turned off and the shaving device is turned off, if the shaving device is left docked in the cleaning device for a prolonged period.

In FIG. 14F the user undocks the shaving device. The movement is recognized so that the display is turned on, and the state of charge is again displayed. The display is used in the normal orientation.

Figure 15:
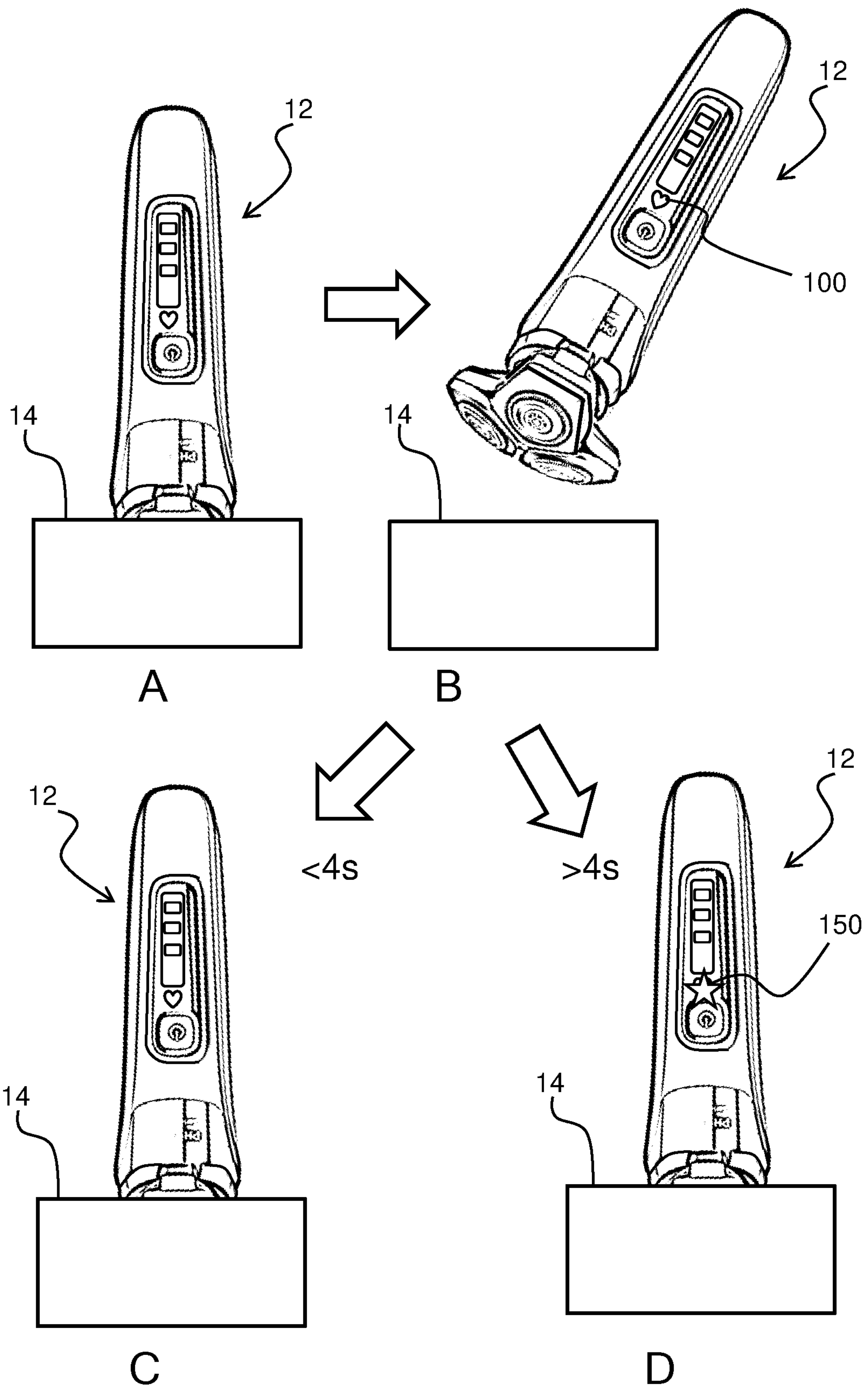
FIG. 15 shows a sequence of steps to show how an interruption of the cleaning program is processed.

FIG. 15 is used to shown how the system responds to an interrupted cleaning program.

FIG. 15A correspond to FIG. 14D, and represent the cleaning program in progress. In FIG. 15B, the shaving device has been undocked before the cleaning program is complete.

A warning signal may be provided, such as the flashing icon 100.

If the shaving device is re-docked, as shown in FIG. 15C within a predetermined second time threshold, such as 4 seconds, the cleaning program can resume.

If the shaving device is not re-docked within the predetermined second time threshold the cleaning program is cancelled and needs to be reactivated using the on-off button. This is indicated to the user as an error message 150 as shown in FIG. 15D.

The cleaning program involves operation of the motor of the shaving device to provide a desired sequence of pump operations within the cleaning device. As an example, the pump operation for a cleaning program may comprise the following sequence:

| Time (sec) | Pump operation description |
|---|---|
| 3 | Cleaning burst (high RPM) removes most of the hairs and debris |
| 10.5 | No pumping, allows debris and hair to settle in sedimentation grid |
| 6 | Cleaning burst (high RPM) with rinsing burst (low RPM) |
| 9 | No pumping, allows debris and hair to settle in sedimentation grid |
| 9 | Alternating high RPM with low RPM for debris removal from difficult areas |
| 6 | No pumping, allows debris and hair to settle in sedimentation grid |

Figure 16:
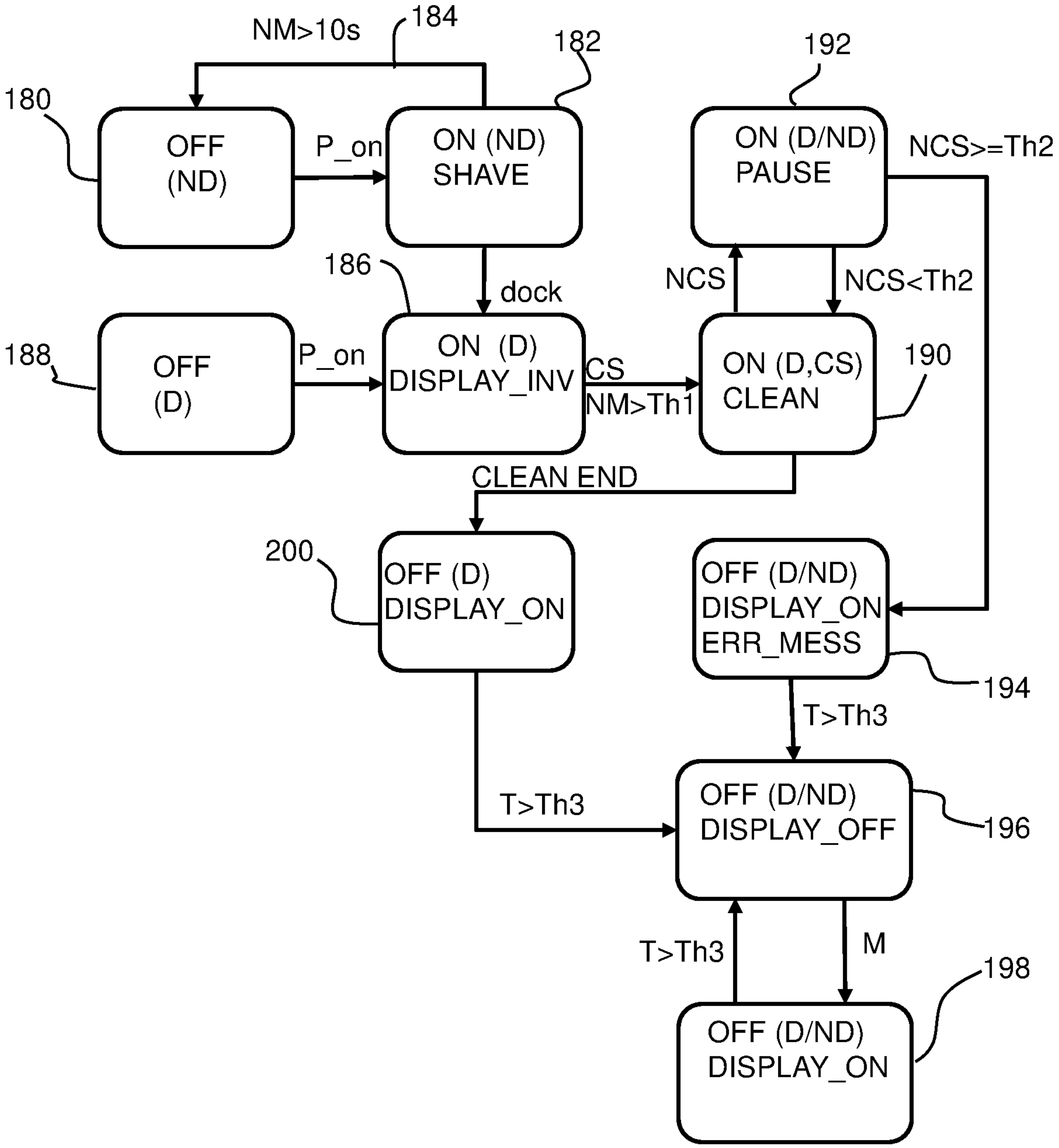
FIG. 16 is a state transition diagram to explain a cleaning method for cleaning a shaving unit.

FIG. 16 shows a state transition diagram to illustrate the cleaning method which gives rise to the functionality explained above with reference to FIGS. 14 and 15.

In FIG. 16, the following terms are used:

OFF=shaver device off

ON=shaver device on

D=docked

ND=not docked

D/ND=may be docked or not docked

P_on=power-on command given by pressing the on-off button

CS=cleaning state

NCS=not cleaning state

Th1=first time threshold of no movement for cleaning state

Th2=second time threshold for maximum pause duration

Th3=third time threshold for display to turn off

M=movement detected

NM=no movement detected

DISPLAY_INV=invert display

ERR_MESS=cleaning error message to be displayed

CLEAN=cleaning program being followed

PAUSE=pause cleaning program

In state 180, the shaving unit is off and is not docked in the cleaning device. A first possibility is that the user turns on the shaving device in the undocked position with the power on command P_on. The shaving device is then on and in the shaving mode in state 182. It is still not docked.

If there is no movement for more than 10 seconds, as shown by transition 184, there is an auto off function and a return to state 180. This assumes the user has finished shaving but not turned the shaving device off.

If the user docks the shaving device in the cleaning device "dock", there is a transition to state 186. The shaving device is on and docked. The display output is inverted to reflect that the shaving device is upside down compared to its normal orientation.

A second possibility is that the user can dock the shaving device in the cleaning device before turning it on. In state 188 the shaving device is docked but not yet turned on. When the power on P_on command is input, there is a transition to state 186 described above.

If the sensed orientation remains corresponding to the cleaning orientation and with no movement for a first time threshold Th1 (e.g. 1.5 seconds) the system enters the cleaning state "CS" during which the cleaning program explained above is followed, in state 190. Thus, the cleaning state may be considered to combine the cleaning orientation and no movement. An interruption to the cleaning state may be because there is detected movement or a detected change in orientation (or both).

If the cleaning program is interrupted (so there is "not cleaning state", NCS), a pause state 192 is reached. If the not cleaning state lasts more than a second time threshold Th2 (longer than the first threshold, e.g. 4 seconds) an error message is given in state 194 and there is an auto off function of the shaving device. The display remains on giving the error message.

If there is instead no interruption during the cleaning program so that the cleaning program has been successfully completed, there is a transition from state 190 to state 200. The shaving device is turned off. The display remains on giving a message that the cleaning program has been successfully completed.

From states 194 and 200, after a third time threshold (e.g. 10 seconds) the display turns off. Thus, in state 196 the shaving device is off and the display is off.

If movement is detected from this state (but the shaving device is not turned on), the display turns on in state 198. The display then indicates the charging level, and provides an indication of whether the cleaning program is needed. The third time threshold again applied for automatic switching off of the display if the shaving device is not moved (or powered on).

If the shaving device is turned on from the OFF states (194, 196, 198, 200), there will be a transition to state 182 or 186 depending on the docking status.

The example above makes use of a mechanical coupling between the shaving device and the cleaning device. An alternative is for the cleaning device to house the processing unit. The shaving device then only provides the orientation sensor output to the cleaning device, where the output is then processed. The cleaning device then has its own power supply.

A further alternative is for the shaving device to provide an electrical coupling to the cleaning device for transferring power as well as control commands. The cleaning device then does not need a local power supply or processing unit. Instead, the shaving device provides electrical power to the cleaning device as well as control commands for the cleaning system (e.g. pump) via an electrical interface rather than a mechanical interface.

The description above relates specifically to the cleaning program. Other functions will be implemented in known manner. For example, the shaving device motor operation is preferably interrupted during charging. This will accordingly cancel the cleaning program. However, the display inversion function may still be implemented, so that if the shaving device is docked in the cleaning device but being charged, the display has the most suitable orientation for the user. Some shaving devices also have a travel lock mode, again during which the cleaning mode is inhibited.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A shaving system comprising a shaving device, a cleaning device and a processing unit, wherein:

the shaving device comprises a main body accommodating a motor, a shaving unit coupled to the main body and an orientation sensor for generating an output signal representing an orientation of the shaving device;

the cleaning device comprises a support structure for supporting the shaving device in a cleaning position for cleaning the shaving unit, the shaving device having a predefined cleaning orientation in said cleaning position; and the processing unit is adapted to:

receive the output signal generated by the orientation sensor; and control the cleaning device to operate according to a predefined cleaning program for cleaning the shaving unit when the orientation of the shaving device represented by the output signal corresponds to said predefined cleaning orientation.

2. The shaving system as claimed in claim 1, wherein the processing unit is adapted to control the cleaning device to operate according to the predefined cleaning program when the orientation sensed by the orientation sensor is any orientation within a predefined range of angular orientations relative to the predefined cleaning orientation.

3. The shaving system as claimed in claim 2, wherein:

the shaving device further comprises a motion sensor for generating an output signal representing motion of the shaving device; and the processing unit is adapted to receive the output signal generated by the motion sensor and to control the cleaning device to operate according to the predefined cleaning program when the orientation sensed by the orientation sensor is any orientation within said predefined range of angular orientations and the motion sensor senses no movement for a sin predefined time period.

4. The shaving system as claimed in claim 2, wherein the processing unit is adapted to:

pause the predefined cleaning program, after being started, when the orientation sensed by the orientation sensor is outside the predefined range of angular orientations;

cancel the predefined cleaning program, after being paused, when the orientation sensed by the orientation sensor is outside the predefined range of angular orientations for more than a predefined time period, and then implement a power-off function of the shaving system; and resume the predefined cleaning program, after being paused, when the orientation sensed by the orientation sensor is again within the predefined range of angular orientations before expiry of the predefined time period.

5. The shaving system as claimed in claim 1, wherein the cleaning device further comprises a reservoir for holding a cleaning fluid and a pump for circulating the cleaning fluid.

6. The shaving system as claimed in claim 5, wherein the shaving device further comprises a drive coupling which is accessible from an outside of the shaving device and drivable by the motor;

the cleaning device further comprises a driven coupling for mechanical connection to the drive coupling of the shaving device when the shaving device is in the cleaning position, such that the motor of the shaving device provides mechanical driving of the pump of the cleaning device; and the processing unit is accommodated in the main body of the shaving device and is adapted to control the motor of the shaving device according to the predefined cleaning program when the orientation sensed by the orientation sensor corresponds to said predefined cleaning orientation, such that the cleaning device is driven by the motor to operate according to the predefined cleaning program when the shaving device is in the cleaning position.

7. The shaving system as claimed in claim 6, wherein:

the shaving device further comprises a user input device for receiving a power-on input from a user; and the processing unit is further adapted to:

receive the power-on input from the user input device; and start the motor of the shaving device to operate according to a shaving program unless or until the processing unit starts the motor to operate according to the predefined cleaning program.

8. The shaving system as claimed in claim 6, wherein the cleaning device is a purely mechanical system.

9. The shaving system as claimed in claim 1, wherein the processing unit is part of the cleaning device.

10. The shaving system as claimed in claim 1, wherein the shaving device further comprises:

a drive coupling which is accessible from an outside of the shaving device and drivable by the motor of the shaving device, wherein the processing unit is further adapted to control the motor to operate according to the predefined cleaning program for the cleaning device when the orientation sensed by the orientation sensor corresponds to the predefined cleaning orientation of the shaving device such that, when the shaving device has said predefined cleaning orientation when being supported in the cleaning position by the cleaning device with the drive coupling coupled to a driven coupling of the cleaning device, the cleaning device is driven by the motor to clean the shaving unit according to the predefined cleaning program.

11. The shaving system as claimed in claim 10, wherein the processing unit is further adapted to control the motor to operate according to the predefined cleaning program when the orientation sensed by the orientation sensor is any orientation within a predefined range of angular orientations relative to the predefined cleaning orientation.

12. The shaving system as claimed in claim 11, wherein:

the shaving device further comprises a motion sensor for generating an output signal representing motion of the shaving device; and the processing unit is further adapted to receive the output signal generated by the motion sensor and to control the motor to operate according to the predefined cleaning program when the orientation sensed by the orientation sensor is any orientation within said predefined range of angular orientations and the motion sensor senses no movement for a predefined time period.

13. A cleaning method for cleaning a shaving unit of a shaving device, using a cleaning device which comprises a support structure for supporting the shaving device in a cleaning position for cleaning the shaving unit, the shaving device having a predefined cleaning orientation in the cleaning position, wherein the shaving device comprises a main body accommodating a motor, the shaving unit being coupled to the main body, and an orientation sensor for generating an output signal representing an orientation of the shaving device, the cleaning method comprising:

receiving the output signal generated by the orientation sensor of the shaving device;

detecting whether the shaving device is in the predefined cleaning orientation based on the output signal of the orientation sensor; and controlling the cleaning device to operate according to a predefined cleaning program for cleaning the shaving unit when the orientation sensed by the orientation sensor corresponds to the predefined cleaning orientation.

14. The cleaning method as claimed in claim 13, wherein controlling the cleaning device comprises:

mechanically connecting a drive coupling of the shaving device to a driven coupling of the cleaning device;

driving the drive coupling using the motor of the shaving device; and controlling the motor such that the motor drives the cleaning device to operate according to the predefined cleaning program.

15. The cleaning method as claimed in claim 13, further comprising:

control the cleaning device to operate according to the predefined cleaning program when the orientation sensed by the orientation sensor is any orientation within a predefined range of angular orientations relative to the predefined cleaning orientation.

16. The cleaning method as claimed in claim 15, further comprising:

receiving a motion output signal generated by a motion sensor indicating motion of the shaving device, wherein the cleaning device is controlled to operate according to the predefined cleaning program when the motion output signal indicates no motion for a predefined time period.

17. The cleaning method as claimed in claim 15, further comprising:

pausing the predefined cleaning program, after being started, when the orientation sensed by the orientation sensor is outside the predefined range of angular orientations; and cancelling the predefined cleaning program, after being paused, when the orientation sensed by the orientation sensor is outside the predefined range of angular orientations for more than a predefined time period, and then implementing a power-off function of the shaving device.

18. The cleaning method as claimed in claim 15, further comprising:

pausing the predefined cleaning program, after being started, when the orientation sensed by the orientation sensor is outside the predefined range of angular orientations; and resuming the predefined cleaning program, after being paused, when the orientation sensed by the orientation sensor is again within the predefined range of angular orientations before expiry of a predefined time period.

19. A shaving system comprising:

a shaving device comprising a main body, a shaving unit coupled to the main body, and an orientation sensor configured to sense an orientation of the shaving device;

a cleaning device configured to support the shaving device in a cleaning position for cleaning the shaving unit, the shaving device having a predefined cleaning orientation in the cleaning position; and a processing unit configured to receive an output signal from the orientation sensor indicating the sensed orientation of the shaving device, and to control the cleaning device to operate according to a predefined cleaning program when the sensed orientation of the shaving device corresponds to the predefined cleaning orientation.

20. The shaving system as claimed in claim 19, wherein the shaving device further comprises a motor in the main body and a drive coupling accessible from an outside of the shaving device and drivable by the motor;

wherein the cleaning device further comprises a pump and a driven coupling for mechanical connection to the drive coupling when the shaving device is in the cleaning position, such that the motor provides mechanical driving of the pump for circulating cleaning fluid from a reservoir; and wherein the processing unit is further configured to control the motor according to the predefined cleaning program when the sensed orientation of the shaving device corresponds to the predefined cleaning orientation, such that the cleaning device is driven by the motor to operate according to the predefined cleaning program when the shaving device is in the cleaning position.

* * * * *